United States Patent
Oyama (10) Patent No.: US 8,768,848 B2
(45) Date of Patent: Jul. 1, 2014

(54) VEHICLE AND METHOD OF CONTROLLING THE SAME

(75) Inventor: Shunsuke Oyama, Aichi-gun (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 91 days.

(21) Appl. No.: 13/575,438

(22) PCT Filed: Jan. 27, 2010

(86) PCT No.: PCT/JP2010/051011
§ 371 (c)(1),
(2), (4) Date: Jul. 26, 2012

(87) PCT Pub. No.: WO2011/092806
PCT Pub. Date: Aug. 4, 2011

(65) Prior Publication Data
US 2012/0303228 A1   Nov. 29, 2012

(51) Int. Cl.
| G06F 7/00 | (2006.01) |
| B60W 20/00 | (2006.01) |
| B60W 10/02 | (2006.01) |
| B60W 10/04 | (2006.01) |
| B60W 10/08 | (2006.01) |
| B60W 30/18 | (2012.01) |

(52) U.S. Cl.
CPC .............. *B60W 20/00* (2013.01); *B60W 10/02* (2013.01); *B60W 10/04* (2013.01); *B60W 10/08* (2013.01); *B60W 20/10* (2013.01); *B60W 2710/08* (2013.01); *B60W 30/18* (2013.01)
USPC ................. 705/54; 477/47; 477/116; 701/55; 701/59

(58) Field of Classification Search
CPC ..... B60W 20/00; B60W 10/02; B60W 10/04; B60W 10/06; B60W 10/08; B60W 20/10; B60W 2710/08; B60W 30/18
USPC ............ 701/54, 65, 55, 95, 409; 477/47, 119, 477/111, 904, 34, 118; 60/489; 303/139, 303/196
See application file for complete search history.

(56) References Cited

U.S. PATENT DOCUMENTS

| 2002/0042672 A1* | 4/2002 | Shiiba et al. ................... 701/65 |
| 2003/0013571 A1* | 1/2003 | Tabata ......................... 475/125 |

(Continued)

FOREIGN PATENT DOCUMENTS

| JP | 2000-175305 A | 6/2000 |
| JP | 2006-094688 A | 4/2006 |

(Continued)

OTHER PUBLICATIONS

International Search Report mailed Mar. 2, 2010 of PCT/JP2010/051011.

*Primary Examiner* — Behrang Badii
(74) *Attorney, Agent, or Firm* — Kenyon & Kenyon LLP (57) ABSTRACT

At or before time t2 when a kick-down switch was off, the higher speed a shift ratio selected by a driver is for, the smaller value a restriction rate K is set to. Consequently, driving force in a Mid-gear ratio is more restricted than driving force in a Lo-gear ratio. Further, driving force in a Hi-gear ratio is more restricted than driving force in the Mid-gear ratio. At time t2 when the kick-down switch changes from off to on, the restriction on driving force employing a restriction rate K is removed, whereupon an increment β in driving force in the Hi-gear ratio is, as it had a greater restricted amount during KD OFF, greater than an increment α in driving force in the Mid-gear ratio. A natural kick-down feeling responsive to the selected shift ratio is thus realized.

6 Claims, 7 Drawing Sheets

(56) References Cited

U.S. PATENT DOCUMENTS

| | | | | |
|---|---|---|---|---|
| 2004/0041469 | A1* | 3/2004 | Ishikawa et al. | 303/139 |
| 2005/0143221 | A1* | 6/2005 | Kuwahara et al. | 477/97 |
| 2008/0134675 | A1* | 6/2008 | Epshteyn | 60/489 |
| 2008/0254937 | A1* | 10/2008 | Makiyama | 477/47 |

FOREIGN PATENT DOCUMENTS

| | | |
|---|---|---|
| JP | 2007-055535 A | 3/2007 |
| JP | 2007-239504 A | 9/2007 |
| JP | 2008-213738 A | 9/2008 |
| JP | 2009-040118 A | 2/2009 |

* cited by examiner

VEHICLE AND METHOD OF CONTROLLING THE SAME

This is a 371 national phase application of PCT/JP2010/051011 filed 27 Jan. 2010, the contents of which are incorporated herein by reference.

TECHNICAL FIELD

The present invention relates to a vehicle and a method of controlling the same.

BACKGROUND ART

Vehicles equipped with an automatic transmission are each provided with a switch called a kick-down switch, which is turned on when an amount of operation of an accelerator pedal is not less than a predetermined amount and turned off when an amount of operation of the accelerator pedal is less than the predetermined amount. When the kick-down switch is turned on in the vehicle equipped with an automatic transmission, the automatic transmission is automatically shifted down to obtain powerful accelerating force.

A technology of applying such kick-down switches to vehicles not equipped with any automatic transmission has been proposed. For example, Japanese Patent Laying-Open No. 2007-239504 (PTL 1) discloses a hybrid vehicle which is not equipped with any automatic transmission but provided with a kick-down switch. When the kick-down switch is off, the hybrid vehicle sets an engine's target power to a restricted value obtained by restricting vehicle requested power, which is based on an amount of operation of an accelerator. When the kick-down switch is on, the hybrid vehicle sets the engine's target power to the vehicle requested power as it is. An acceleration feeling requested by a driver can thereby be gained when the kick-down switch switches from off to on.

CITATION LIST

Patent Literature

PTL 1: Japanese Patent Laying-Open No. 2007-239504

SUMMARY OF INVENTION

Technical Problem

However, some of the vehicles not equipped with any automatic transmission are provided with a shift lever for a driver to select a shift ratio, and travel responsive to the selected shift ratio. When the kick-down switch is applied to such a vehicle, if acceleration feeling at the time of a change in the kick-down switch from off to on is equal regardless of the selected shift ratio, then it could give a feeling of strangeness to the driver.

The present invention has been made to solve the problem as described above, and an object of the present invention is to provide a driver with a natural acceleration feeling responsive to a selected shift ratio when a kick-down switch changes from off to on in a vehicle capable of traveling responsive to a shift ratio selected by a driver.

Solution to Problem

A vehicle according to the present invention is capable of traveling responsive to a selected shift ratio selected by a driver from a plurality of shift ratios. The vehicle includes: a driving device generating driving force for the vehicle to travel; a switch turned off when an amount of operation of an accelerator by the driver is less than a predetermined amount, and turned on when the amount of operation of the accelerator is greater than the predetermined amount; and a control device controlling the driving device to increase the driving force when the switch changes from off to on, by placing a restriction on the driving force when the switch is off and removing the restriction on the driving force when the switch is on. The control device changes, responsive to the selected shift ratio, an increment in the driving force when the switch changes from off to on.

Preferably, the higher speed shift ratio the selected shift ratio is, to the greater value the control device sets the increment in the driving force when the switch changes from off to on.

Preferably, the higher speed shift ratio the selected shift ratio is, to the greater value the control device sets an amount of the restriction on the driving force when the switch is off, so that the higher speed shift ratio the selected shift ratio is, the greater value the increment in the driving force when the switch changes from off to on is.

Preferably, the control device places no restriction on the driving force even when the switch is off when the selected shift ratio is a lowest speed shift ratio.

Preferably the driving device includes at least a rotating electric machine using electric power to generate the driving force. The vehicle is an electric vehicle or a hybrid vehicle capable of traveling by the driving force generated by the rotating electric machine.

A vehicle according to another aspect of the present invention is capable of traveling responsive to a selected shift ratio selected by a driver from a plurality of shift ratios. The vehicle includes: a driving device generating driving force for the vehicle to travel; a switch turned off when an amount of operation of an accelerator by the driver is less than a predetermined amount, and turned on when the amount of operation of the accelerator is greater than the predetermined amount; and a control device controlling the driving device to increase the driving force when the switch changes from off to on, by placing a restriction on the driving force when the switch is off and removing the restriction on the driving force when the switch is on. The control device includes: a calculating unit calculating, responsive to the selected shift ratio, a restriction rate employed for restricting base driving force responsive to the amount of operation of the accelerator; and a control unit controlling the driving device to increase the driving force when the switch changes from off to on, by placing a restriction on the base driving force employing the restriction rate when the switch is off and removing the restriction on the base driving force employing the restriction rate when the switch is on. The calculating unit calculates the restriction rate such that when the selected shift ratio is a lowest speed shift ratio, substantially no restriction is placed on the base driving force, and calculates the restriction rate such that when the selected shift ratio is not the lowest speed shift ratio, the higher speed shift ratio the selected shift ratio is, the greater an amount of the restriction on the base driving force is.

A control method according to another aspect of the present invention is a control method performed by a control device of a vehicle capable of traveling responsive to a selected shift ratio selected by a driver from a plurality of shift ratios. The vehicle includes: a driving device generating driving force for the vehicle to travel; and a switch turned off when an amount of operation of an accelerator by the driver is less than a predetermined amount, and turned on when the amount of operation of the accelerator is greater than the predetermined amount. The control method includes the steps of: determining the selected shift ratio; and controlling the driving device to increase the driving force when the switch changes from off to on, by placing a restriction on the driving force when the switch is off and removing the restriction on the driving force when the switch is on. The step of controlling the driving device includes the step of changing, responsive to the selected shift ratio, an increment in the driving force when the switch changes from off to on.

Advantageous Effects of Invention

The present invention enables providing a driver with a natural acceleration feeling responsive to a selected shift ratio when a switch (kick-down switch) changes from off to on in a vehicle capable of traveling responsive to a shift ratio selected by a driver.

DESCRIPTION OF EMBODIMENTS

Embodiment of the present invention will be described hereinafter with reference to the drawings. In the description below, the same components have the same reference characters allotted. They also have the same names and functions. Therefore, a detailed description thereof will not be repeated.

Figure 1:
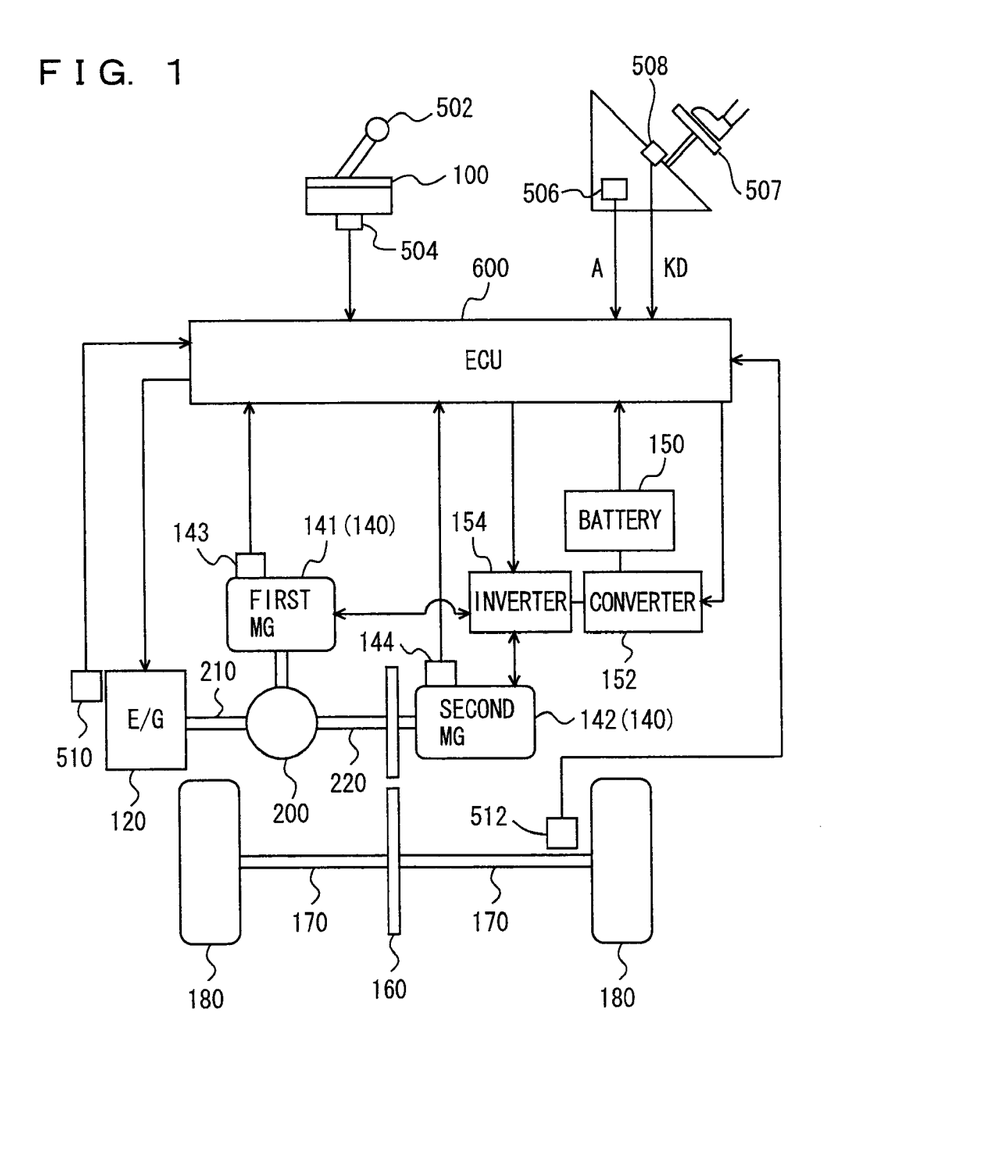
FIG. 1 is a schematic configuration diagram of a hybrid vehicle.

FIG. 1 is a schematic configuration diagram of a hybrid vehicle 1 including a control device according to the present embodiment. It is noted that the control device according to the present invention is applicable not only to hybrid vehicle 1 shown in FIG. 1, but also generally to vehicles which are not equipped with any automatic transmission, such as a hybrid vehicle of a different form than that of hybrid vehicle 1 and an electric vehicle (a vehicle which travels by driving force generated by a motor using electric power).

Hybrid vehicle 1 includes an engine 120, a first motor generator ("motor generator" will be hereinafter abbreviated to "MG") 141, and a second MG 142. It is noted that for convenience of illustration, first MG 141 and second MG 142 may be hereinafter referred to as MG 140 when it is not necessary to discriminate between them.

MG 140 can selectively function as a generator and a motor responsive to the traveling state of hybrid vehicle 1. Rotation shaft of second MG 142 is coupled to drive wheels 180 via a speed reducer 160 and a drive shaft 170. Hybrid vehicle 1 travels by driving force of at least any one of engine 120 and second MG 142. When second MG 142 functions as the generator, kinetic energy of the vehicle is converted into electric energy to perform regenerative braking to reduce the speed of the vehicle.

In addition, hybrid vehicle 1 includes a motive power split mechanism 200, a battery 150, a converter 152, an inverter 154, and a control device 600, for example.

Motive power split mechanism 200 has an input shaft 210 connected to a crank shaft of engine 120 and divides motive power generated by engine 120 into two paths, that is, drive wheels 180 and first MG 141.

Figure 2:
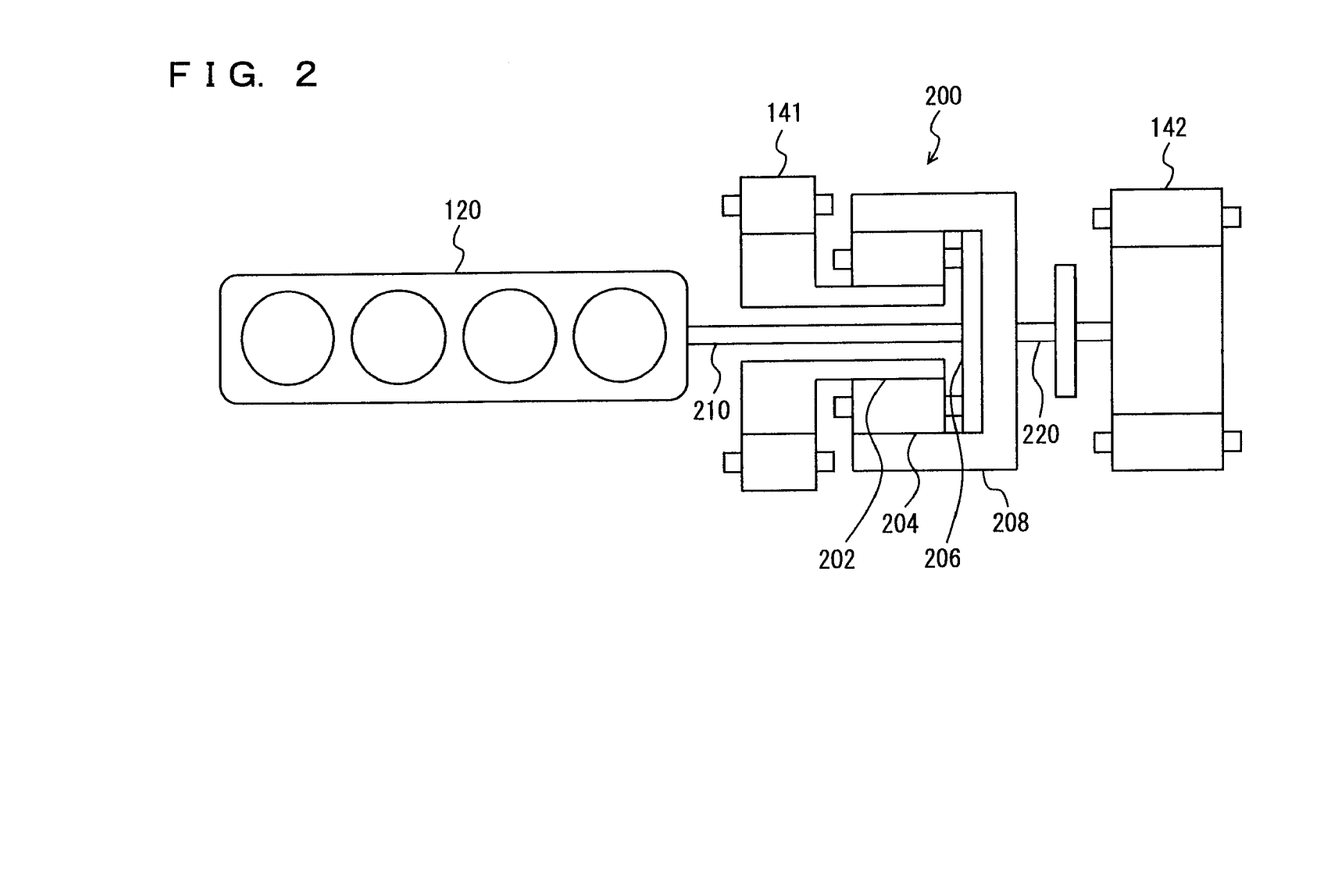
FIG. 2 is a schematic configuration diagram of a motive power split mechanism.

FIG. 2 shows a schematic configuration diagram of motive power split mechanism 200. Motive power split mechanism 200 is formed of a planetary gear including a sun gear 202, pinion gears 204, a carrier 206, and a ring gear 208. Pinion gears 204 are engaged with sun gear 202 and ring gear 208. Carrier 206 carries pinion gears 204 such that they are rotatable. Sun gear 202 is coupled to a rotation shaft of first MG 141. Carrier 206 is coupled to the crank shaft of engine 120. Ring gear 208 is coupled to an output shaft 220.

Figure 3:
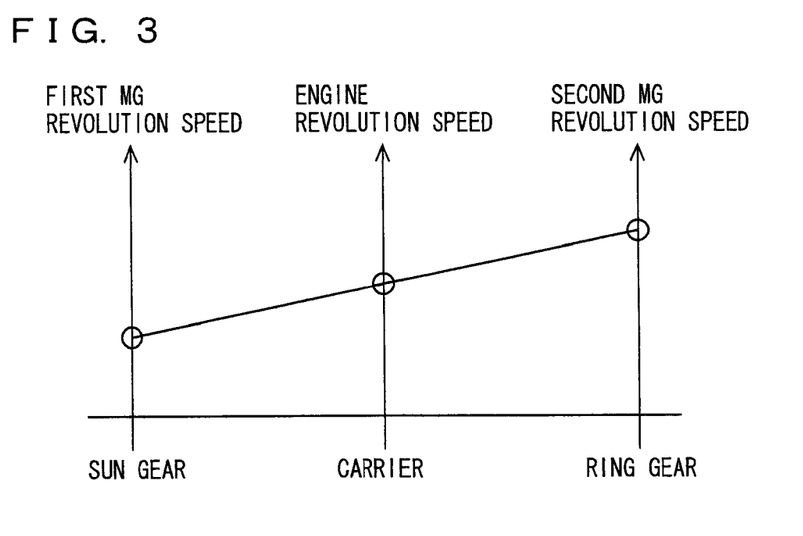
FIG. 3 is an alignment chart showing the relation between the revolution speeds of an engine, a first MG, and a second MG.

Since engine 120, first MG 141 and second MG 142 are coupled via motive power split mechanism 200 formed of the planetary gear, the revolution speeds of engine 120, first MG 141, and second MG 142 exhibit a relation represented by a straight line in an alignment chart, for example, as shown in FIG. 3 (which represents an example of the relation during steady state driving). By using this relation, the revolution speed of first MG 141 can be adjusted to adjust the ratio of engine revolution speed NE to the revolution speed of second MG 142 (i.e., vehicle speed V).

Referring to FIG. 1 again, battery 150 stores electric power for driving MG 140. Battery 150 is typically made of a DC secondary battery of nickel-metal hydride, lithium ion or the like. It is noted that instead of battery 150, a capacitor of large capacitance may be used.

Converter 152 is provided between battery 150 and inverter 154 and performs voltage conversion between battery 150 and inverter 154 based on a control signal from control device 600. A voltage VH output from converter 152 to inverter 154 is thereby controlled at a value responsive to the control signal from control device 600.

Inverter 154 is provided between converter 152 and MG 140 and performs power conversion between the DC power of converter 152 and the AC power of MG 140 based on a control signal from control device 600, thereby controlling current supplied to MG 140. The revolution speed and output torque of MG 140 are thereby controlled at values responsive to the control signal from control device 600, respectively.

Control device 600 is an electronic control unit (ECU) with a built in CPU (Central Processing Unit) and a built in memory, both not shown in the drawings.

Control device 600 is connected via a harness and the like to resolver circuits 143, 144, a shift position sensor 504, an accelerator pedal position sensor 506, an engine revolution speed sensor 510, a vehicle speed sensor 512, and the like.

Resolver circuits 143, 144 sense the revolution speeds and revolution directions of first MG 141 and second MG 142. Shift position sensor 504 senses a position of a shift lever 502 that is operated by a driver. Accelerator pedal position sensor 506 senses an amount by which the driver operates an accelerator pedal 507 (hereinafter referred to as "accelerator operation amount A"). It is noted that accelerator operation amount A will be hereinafter described as the ratio of an amount of actual operation of accelerator pedal 507 to its total operable amount (unit; percentage). Engine revolution speed sensor 510 senses engine revolution speed (the revolution speed of engine 120) NE. Vehicle speed sensor 512 senses the revolution speed of drive shaft 170 as vehicle speed V. Each of these sensors outputs a sensing result to control device 600.

Control device 600 is further connected to a kick-down switch 508. Kick-down switch 508 abuts against accelerator pedal 507 when accelerator operation amount A is a predetermined amount. The predetermined amount is described in the description below as, but not limited to, 80 percent. An elastic body (such as a spring), which is not shown in the drawings, is attached to kick-down switch 508 so that an operational feel of the accelerator on and after the abutment of accelerator pedal 507 against kick-down switch 508, is heavier than before the abutment.

Kick-down switch 508 is turned off when accelerator operation amount A is not more than 80 percent. Kick-down switch 508 is turned on when kick-down switch 508 is in abutment with accelerator pedal 507 (accelerator operation amount A=80 percent) and the driver applies greater force to depresses accelerator pedal 507 further and causes accelerator operation amount A to increase above 80 percent. When kick-down switch 508 is turned on, a kick-down signal KD is sent from kick-down switch 508 to control device 600. It is noted that in the following, "KD OFF" means a state in which kick-down switch 508 is turned off, while "KD ON" means a state in which kick-down switch 508 is turned on.

Control device 600 executes a predetermined arithmetic processing based on a signal sent from each of the above-described sensors and a map and/or program stored in the memory and controls each equipment and the like such that hybrid vehicle 1 is in a desired traveling state. It is noted part of the processing may be executed by hardware (such as an electronic circuit) of control device 600.

Figure 4:
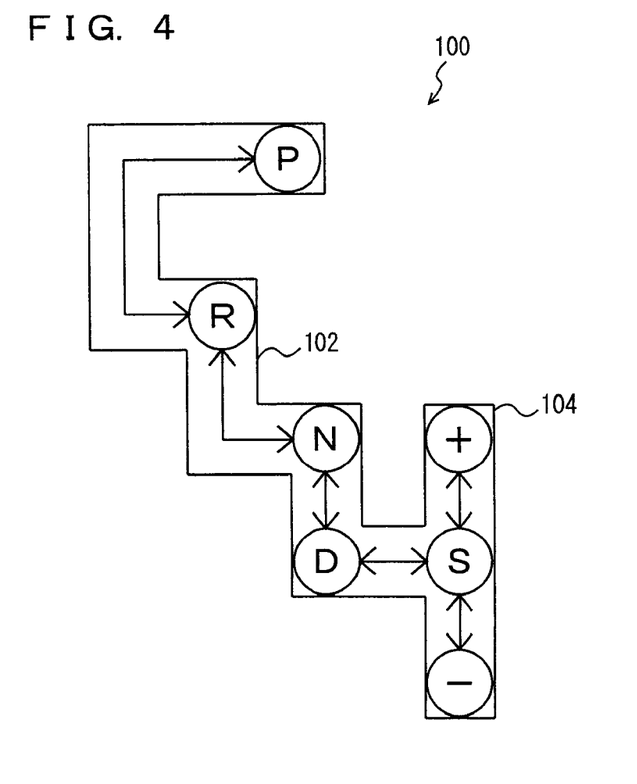
FIG. 4 shows the shape of a shift gate.

Referring to FIG. 4, a path for shift lever 502 to move will be described. A driver can move shift lever 502 along a shift gate 100. Shift gate 100 is formed of a main gate 102 and a sub-gate 104.

In main gate 102, a plurality of shift positions, specifically, a forward position (D position), a neutral position (N position), a parking position (P position), and a reverse position (R position) are provided.

Sub-gate 104 is connected to the D position in main gate 102. Sub-gate 104 has a central portion at which an S position is provided. Sub-gate 104 has an upper end and a lower ends on which a (+) position and a (−) position are provided, respectively.

When the driver performs an operation that moves shift lever 502 from the S position to the (+) position (hereinafter referred to as "(+) operation"), shift position sensor 504 sends a signal indicating the (+) operation to control device 600. On the other hand, when the driver performs an operation that moves shift lever 502 from the S position to the (−) position (hereinafter referred to as "(−) operation"), shift position sensor 504 sends a signal indicating the (−) operation to control device 600.

By changing the position of shift lever 502, the driver can change the power transmitting state of motive power split mechanism 200.

When shift lever 502 is positioned at the D position, control device 600 controls hybrid vehicle 1 in an automatic shift mode. In the automatic shift mode, control device 600 controls engine 120 and MG 140 such that the ratio of engine revolution speed NE to vehicle speed V continuously changes responsive to the state of the vehicle.

In contrast, when shift lever 502 is positioned at the S position, control device 600 controls hybrid vehicle 1 in a manual shift mode. In the manual shift mode, control device 600 defines the ratio of engine revolution speed NE to vehicle speed V, responsive to a shift ratio selected by the driver (hereinafter referred to as "selected shift ratio"). Specifically, control device 600 sets a lower limit revolution speed NEmin of engine revolution speed NE based on vehicle speed V and a selected shift ratio and utilizes the above-described relation shown in FIG. 3 to restrict engine revolution speed NE to a value not less than lower limit revolution speed NEmin. A quasi-shift-gear can thereby be formed also in hybrid vehicle 1 which is not equipped with any stepwise or discontinuously variable automatic transmission.

Receiving a signal indicating the (+) operation, control device 600 changes the selected shift ratio to a one-step higher speed shift ratio than the current shift ratio. On the other hand, receiving a signal indicating the (−) operation, control device 600 changes the selected shift ratio to a one-step lower speed shift ratio than the current shift ratio.

Figure 5:
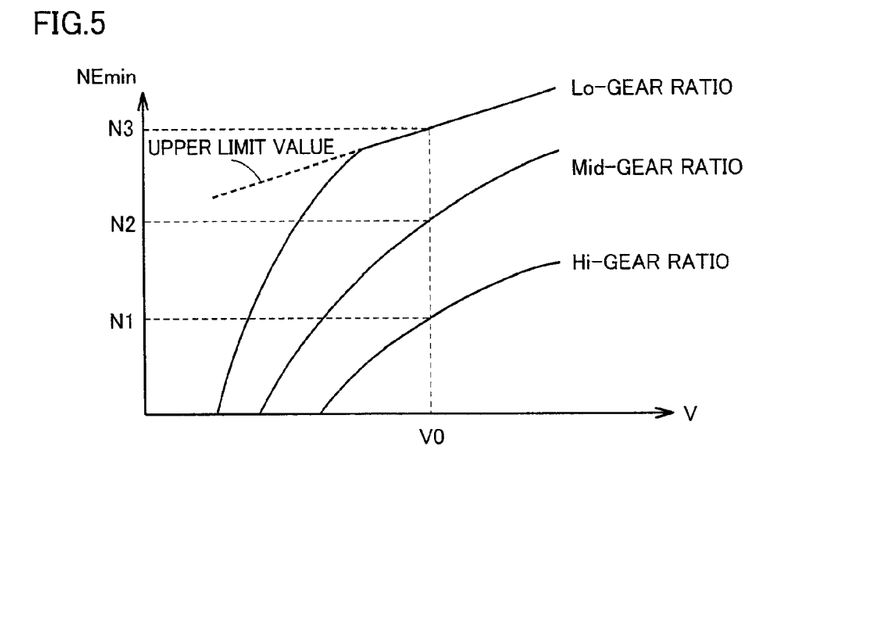
FIG. 5 shows the relation between vehicle speed V, selected shift ratios, and lower limit revolution speed NEmin.

FIG. 5 shows the relation between vehicle speed V, selected shift ratios, and lower limit revolution speed NEmin. It is noted that the following description exemplary illustrates a case where there are three driver-selectable shift ratios, that is, a low speed shift ratio (Lo-gear ratio), a medium speed shift ratio (Mid-gear ratio), a high speed shift ratio (Hi-gear ratio); however, the number of shift ratios from which a driver can make a selection are not limited to three.

Lower limit revolution speed NEmin is set employing vehicle speed V and a selected shift ratio as parameters. The lower speed the shift ratio is for, the greater value the ratio of lower limit revolution speed NEmin to vehicle speed V (=NEmin/V) is set to. For instance, as shown in FIG. 5, assuming that lower limit revolution speeds NEmin in the Hi-gear ratio, the Mid-gear ratio, and the Lo-gear ratio when vehicle speed V=V0, are N1, N2, and N3, respectively, then a relation N1<N2<N3 is satisfied. Therefore, for example, when the selected shift ratio is changed from the Mid-gear ratio to the Lo-gear ratio while traveling at vehicle speed V=V0, lower limit revolution speed NEmin is increased from N2 to N3. With this increase, engine revolution speed NE is also increased, being restricted to a value not less than N3. As a result, it is possible to give a driver a quasi-feeling of as if an automatic transmission were shifted down responsive to the driver's shift operation.

Next, kick-down control in the present embodiment will be described. Generally, a vehicle equipped with a stepwise or discontinuously variable automatic transmission shifts down the automatic transmission so as to generate greater driving force (obtain more powerful accelerating force) when kick-down switch 508 is turned on. However, hybrid vehicle 1 in the present embodiment is not equipped with any stepwise or discontinuously variable automatic transmission.

Thus, control device 600 places a restriction on driving force during KD OFF in advance, and removes the restriction during KD ON to increase driving force. This chain of control is the kick-down control in the present embodiment. The kick-down control makes it possible to give a driver a quasi-feeling of as if an automatic transmission were shifted down during KD ON (which is a so called kick-down feeling) in hybrid vehicle 1 not equipped with any stepwise or discontinuously variable automatic transmission.

Further, in the present embodiment, an amount by which driving force is restricted in the kick-down control in the manual shift mode is variable according to each selected shift ratio. Specifically, the higher speed shift ratio a selected shift ratio is, to the greater amount control device 600 sets an amount of a restriction on driving force. This makes it possible that the higher speed shift ratio a selected shift ratio is, the greater an increment in driving force at the time of a change from KD OFF to KD ON is, and that a more natural kick-down feeling responsive to the selected shift ratio is realized. In this way, the present embodiment is most characterized in that an amount by which driving force is restricted in the kick-down control in the manual shift mode during KD OFF, is variable according to each selected shift ratio.

Figure 6:
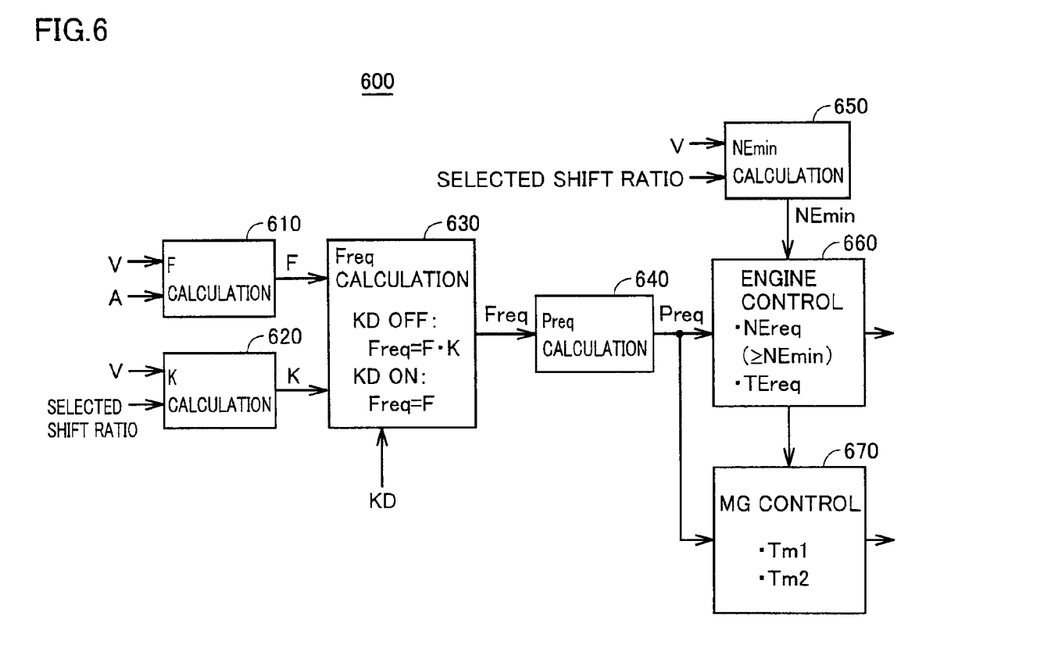
FIG. 6 is a functional block diagram of a control device.

FIG. 6 is a functional block diagram of part of control device 600 relating to control on driving force in the manual shift mode. It is noted that each functional block shown in FIG. 6 may be realized by providing hardware (such as an electronic circuit) having such function in control device 600 or may be realized by causing control device 600 to perform software processing (such as executing a program) corresponding to such function.

Control device 600 includes a base driving force calculating unit 610, a restriction rate calculating unit 620, a request driving force calculating unit 630, a request power calculating unit 640, a lower limit revolution speed calculating unit 650, an engine control unit 660, and an MG control unit 670.

Base driving force calculating unit 610 calculates base driving force F for driving hybrid vehicle 1 based on vehicle speed V and accelerator operation amount A.

Figure 7:
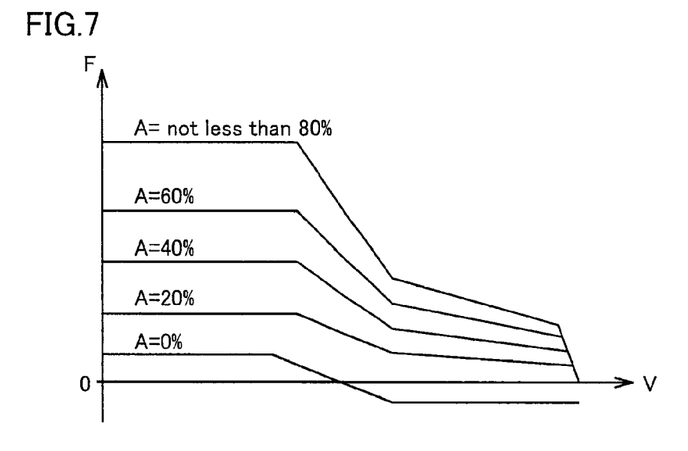
FIG. 7 shows the correspondence relation between vehicle speed V, accelerator operation amounts A, and base driving force F.

FIG. 7 shows the correspondence relation between vehicle speed V, accelerator operation amounts A, and base driving force F. As shown in FIG. 7, the greater accelerator operation amount A is, the greater value base driving force F is set to. When vehicle speed V is in a range above a predetermined value, the higher vehicle speed V is, the smaller value base driving force F is set to. For instance, at and after the abutment of accelerator pedal 507 against kick-down switch 508, since accelerator operation amount A is not less than 80 percent, a line with a legend "A=not less than 80%" in FIG. 7 is used to calculate base driving force F corresponding to vehicle speed V.

Returning to FIG. 6, restriction rate calculating unit 620 calculates restriction rate K for driving force during KD OFF, based on vehicle speed V and a selected shift ratio. It is noted that as described above, the selected shift ratio is determined by the (+) operation or (−) operation by a driver.

Figure 8:
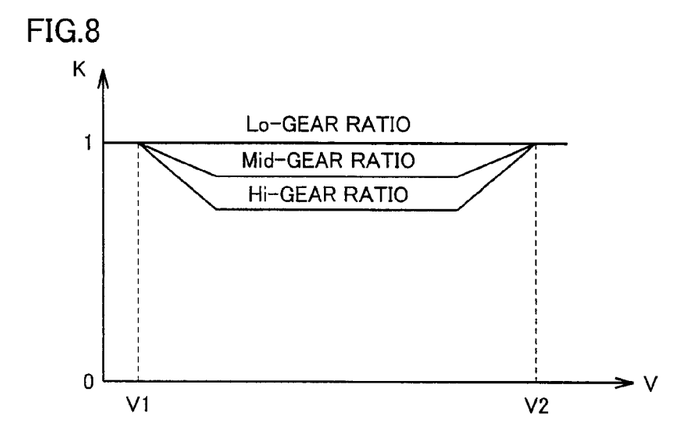
FIG. 8 shows the correspondence relation between vehicle speed V, selected shift ratios, and a restriction rate K.

FIG. 8 shows the correspondence relation between vehicle speed V, selected shift ratios, and restriction rate K. As shown in FIG. 8, when vehicle speed V is in a range lower than a predetermined speed V1 or when vehicle speed V is in a range higher than a predetermined speed V2 (>V1), restriction rate K is set to "1" regardless of a selected shift ratio. In contrast, when vehicle speed V is in a range of predetermined speed V1 to predetermined speed V2, the higher speed shift ratio a selected shift ratio is, the smaller value restriction rate K is set to. It is noted that in the present embodiment, as shown in FIG. 8, when the selected shift ratio is the Lo-gear ratio, restriction rate K remains set to "1" even when vehicle speed V is in a range of predetermined speed V1 to predetermined speed V2.

Returning to FIG. 6 again, request driving force calculating unit 630 calculates request driving force Freq based on base driving force F from base driving force calculating unit 610, restriction rate K from restriction rate calculating unit 620, and kick-down signal KD from kick-down switch 508. During KD OFF, request driving force calculating unit 630 calculates the product of base driving force F by restriction rate K and sets the calculation result as request driving force Freq. On the other hand, during KD ON, request driving force calculating unit 630 sets request driving force Freq to base driving force F as it is.

Figure 9:
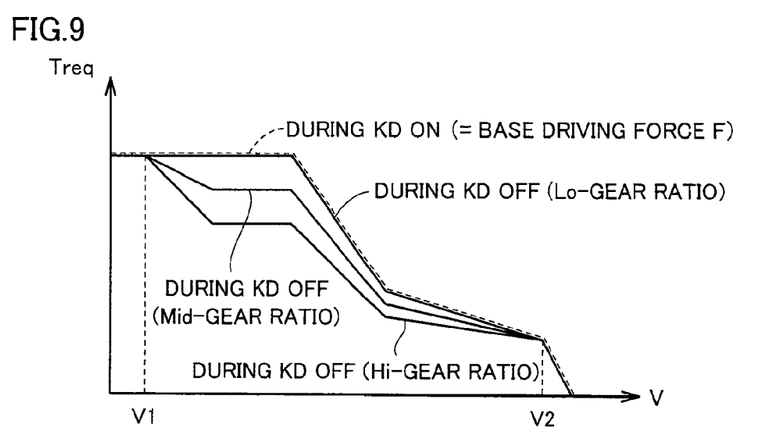
FIG. 9 shows the correspondence relation between vehicle speed V, selected shift ratios, and request driving force Freq.

FIG. 9 shows the correspondence relation between vehicle speed V, selected shift ratios, and request driving force Freq, with a distinction between during KD OFF and during KD ON. It is noted that in FIG. 9 request driving force Freq during KD ON is indicated by a broken line, and request driving force Freq during KD OFF is indicated by a solid line. Therefore, the difference between the broken line and the solid line shown in FIG. 9 is equivalent to the increment in driving force at the time of a change from KD OFF to KD ON.

During KD ON, request driving force Freq=base driving force F and request driving force Freq is unaffected by restriction rate K. That is, request driving force Freq during KD ON is base driving force F for when accelerator operation amount A is not less than 80 percent (the line with a legend "A=not less than 80%" in FIG. 7).

On the other hand, during KD OFF, request driving force Freq=base driving force F×restriction rate K, and request driving force Freq is restricted by restriction rate K. The higher speed the shift ratio is for, the smaller value restriction rate K is set to (see FIG. 8 described above). Therefore, the higher speed the shift ratio is for, the greater extent request driving force Freq during KD OFF is restricted relative to base driving force F.

This results in that the higher speed shift ratio a selected shift ratio is, the greater an increment in driving force at the time of a change from KD OFF to KD ON (the difference between the broken line and the solid line shown in FIG. 9) is, and makes it possible to realize a more natural acceleration feeling responsive to a selected shift ratio.

It is noted that, as a matter of course, a vehicle equipped with a stepwise or discontinuously variable automatic transmission cannot shift down in the lowest speed shift ratio even when a kick-down switch is turned on. In view of this point, in the present embodiment, when the selected shift ratio is the Lo-gear ratio (the lowest speed shift ratio), restriction rate K is constantly set to "1" (see FIG. 8 described above), so that substantially no restriction will be placed on request driving force Freq even during KD OFF. In other words, when the selected shift ratio is the Lo-gear ratio, driving force is not caused to change even at the time of a change from KD OFF to KD ON. Therefore, it is possible also in hybrid vehicle 1 not equipped with any stepwise or discontinuously variable automatic transmission, to provide a driver with a feeling which is closer to that of a vehicle equipped with a stepwise or discontinuously variable automatic transmission.

Referring back to FIG. 6, request power calculating unit 640 calculates vehicle request power Preq, which is requested of hybrid vehicle 1 as a whole, based on request driving force Freq from request driving force calculating unit 630. For example, request power calculating unit 640 calculates charging/discharging request power Pb requested by battery 150 and calculates the sum of request driving force Freq and charging/discharging request power Pb, as vehicle request power Preq.

Lower limit revolution speed calculating unit 650 calculates lower limit revolution speed NEmin of engine 120, employing vehicle speed V and a selected shift ratio as parameters, as described above (see FIG. 5 described above).

Engine control unit 660 calculates request engine revolution speed NEreq and request engine torque TEreq, based on vehicle request power Preq, lower limit revolution speed NEmin, and the like. For example, engine control unit 660 calculates request engine revolution speed NEreq and request engine torque TEreq such that a relation of NEreq× TEreq=Preq is satisfied. In doing so, engine control unit 660 restricts request engine revolution speed NEreq to a value not less than lower limit revolution speed NEmin. Then, engine control unit 660 controls engine 120 such that engine revolution speed NE is at request engine revolution speed NEreq and that engine torque TE is at request engine torque TEreq.

Consequently, engine revolution speed NE is controlled responsive to a selected shift ratio.

MG control unit 670 controls MG 140 such that actual vehicle driving force is at vehicle request power Preq. For instance, in view of the relation shown in FIG. 3, MG control unit 670 calculates a request torque Tm1 of first MG 141 such that engine revolution speed NE is at request engine revolution speed NEreq. Next, MG control unit 670 calculates the difference between a torque obtained by converting request engine torque TEreq and request torque Tm1 of first MG 141 into vehicle driving force and vehicle request power Preq, as a request torque Tm2 of second MG 142. MG control unit 670 then controls first MG 141 and the second MG such that the actual torque of first MG 141 is at request torque Tm1 and that the actual torque of second MG 142 is at request torque Tm2.

Owing to the functions of engine control unit 660 and MG control unit 670, the actual vehicle driving force is at a value corresponding to vehicle request power Preq.

Figure 10:
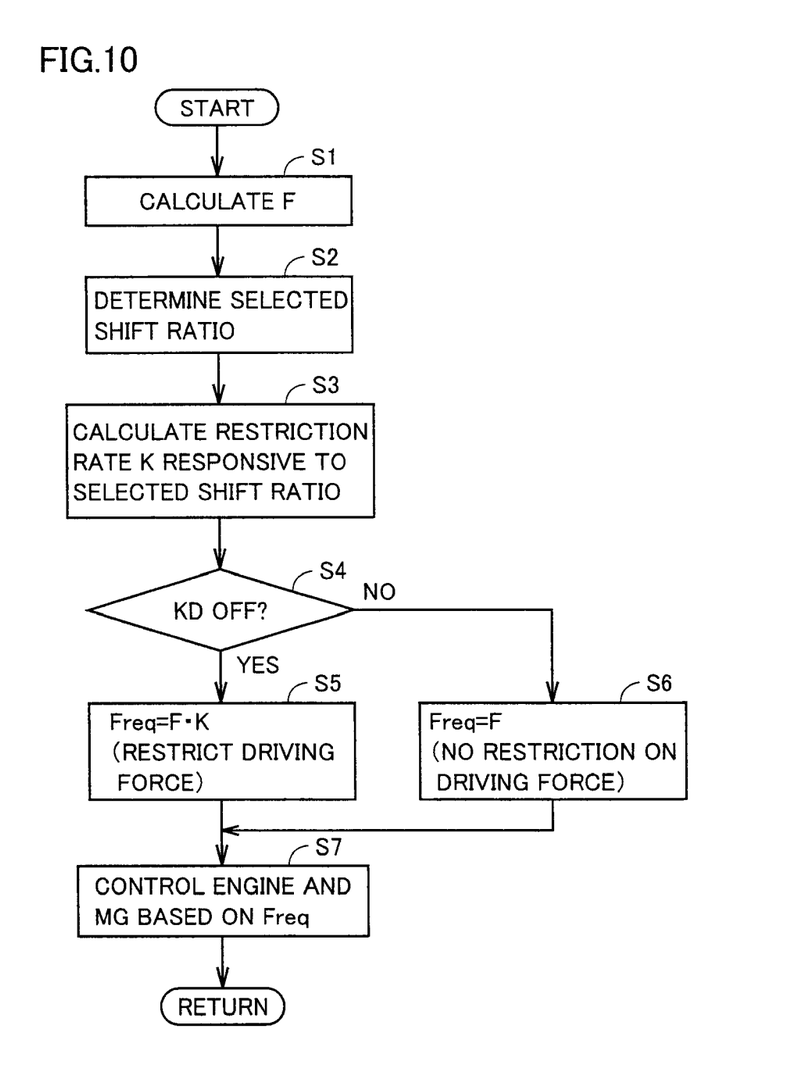
FIG. 10 is a flowchart showing process steps of the control device.

FIG. 10 is a flowchart showing process steps for realizing the above-described function of control device 600. The process shown in this flowchart is repeatedly carried out at a predetermined cycle time. Basically, each step (step will be hereinafter abbreviated to "S") in the flowchart is realized through software processing by control device 600, but may be realized through hardware processing by an electronic circuit and the like provided in control device 600.

In S1, control device 600 calculates base driving force F based on vehicle speed V and accelerator operation amount A (see FIG. 7 described above).

In S2, control device 600 determines the selected shift ratio based on the operation of shift lever 502 by a driver (such as the above-described (+) operation or (−) operation).

In S3, control device 600 calculates restriction rate K for driving force during KD OFF, based on vehicle speed V and the selected shift ratio. In doing so, the higher speed shift ratio the selected shift ratio is, the smaller value control device 600 sets restriction rate K to, as shown in FIG. 8 described above.

In S4, control device 600 determines whether or not it is KD OFF. If it is KD OFF (YES in S4), the process shifts to S5. If not (NO in S4), the process shifts to S6.

In S5, control device 600 sets the product of base driving force F by restriction rate K as request driving force Freq. That is, control device 600 restricts base driving force F, employing restriction rate K.

In S6, control device 600 sets request driving force Freq to base driving force F as it is. That is, control device 600 places no restriction on base driving force F employing restriction rate K. When base driving force F was under a restriction until just before this process, this process removes the restriction on base driving force F.

In S7, control device 600 calculates, as described above, vehicle request power Preq based on request driving force Freq and controls engine 120 and MG 140 such that the actual vehicle driving force is at vehicle request power Preq.

Figure 11:
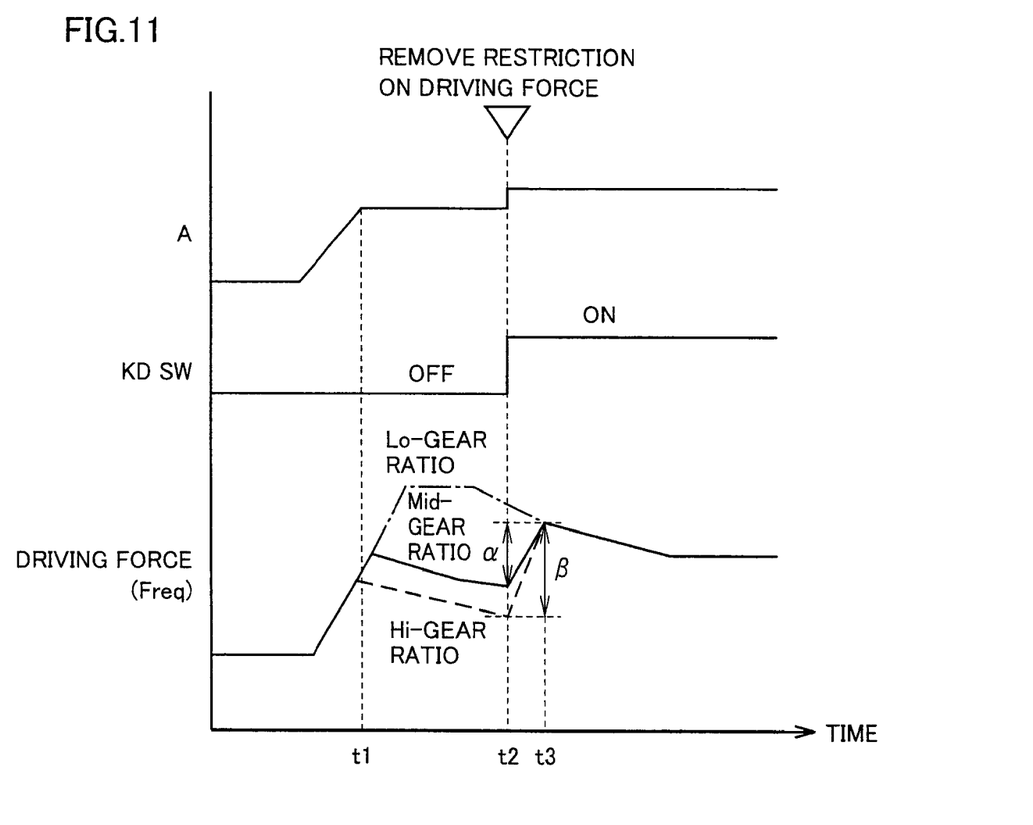
FIG. 11 shows a timing chart of driving force.

FIG. 11 shows a timing chart of driving force when the kick-down control in the present embodiment is carried out. It is noted that in FIG. 11, the driving force indicated by alternate long and short dashed lines shows driving force when the selected shift ratio is the Lo-gear ratio, the driving force indicated by a solid line shows driving force when the selected shift ratio is the Mid-gear ratio, and the driving force indicated by a broken line shows driving force when the selected shift ratio is the Hi-gear ratio.

When a driver starts depressing accelerator pedal 507 and accelerator operation amount A reaches 80 percent at time t1, accelerator pedal 507 abuts against kick-down switch 508. When the driver depresses accelerator pedal 507 further with greater depressing force at time t2, accelerator operation amount A increases above 80 percent, and kick-down switch 508 is turned on.

At or before time t2 when kick-down switch 508 is off, the higher speed a selected shift ratio is for, the smaller value restriction rate K is set to. Consequently, driving force in the Mid-gear ratio is more restricted than driving force in the Lo-gear ratio. Further, driving force in the Hi-gear ratio is more restricted than driving force in the Mid-gear ratio. It is noted that the restriction rate in the Lo-gear ratio is "1", which is a state where driving force is substantially not restricted.

At time t2 when kick-down switch 508 changes from off to on, the restriction on driving force employing restriction rate K is removed, and driving force will increase provided that it is during traveling in the Hi-gear ratio or the Mid-gear ratio. In that case, an increment 13 in driving force in the Hi-gear ratio is, as it had a greater restricted amount during KD OFF, greater than an increment a in driving force in the Mid-gear ratio. For this reason, a natural kick-down feeling responsive to the selected shift ratio is realized.

As above, in the present embodiment, a kick-down feeling is realized by placing a restriction on base driving force F during KD OFF employing restriction rate K in advance and removing the restriction during KD ON, where the higher speed the shift ratio is for, the greater amount an amount of a restriction on driving force during KD OFF is set, so that the higher speed the shift ratio is for, the greater an increment in driving force at the time of a change from KD OFF to KD ON is. This makes it possible to realize a more natural acceleration feeling responsive to the selected shift ratio, as compared with a case where the increment in driving force at the time of the change from KD OFF to KD ON is a uniform amount irrespective of the selected shift ratio.

It is noted that although base driving force F is restricted at restriction rate K responsive to a selected shift ratio in the present embodiment, a subject to be restricted is not limited to base driving force F. For example, a base driving torque, which is calculated based on vehicle speed V and accelerator operation amount A, may be restricted at restriction rate K responsive to a selected shift ratio.

Further, although the ratio of engine revolution speed NE to vehicle speed V is changed responsive to a selected shift ratio using motive power split mechanism 200 in the present embodiment (see FIG. 5), a subject to be changed responsive to a selected shift ratio is not limited thereto. For example, a subject to be changed responsive to a selected shift ratio may be a rate of change of driving force, the magnitude of driving force relative to accelerator operation amount A, an amount of regenerative braking, or the like. In this case, the application to a vehicle which does not have motive power split mechanism 200 can also be readily achieved.

It should be understood that the embodiment disclosed herein is illustrative and non-restrictive in every respect. The scope of the present invention is defined by the terms of the claims rather than the above description, and is intended to include any modifications within the scope and meaning equivalent to the terms of the claims.

REFERENCE SIGNS LIST 1 hybrid vehicle; 141 first MG; 142 second MG; 100 shift gate; 102 main gate; 104 sub-gate; 120 engine; 143, 144 resolver circuit; 150 battery; 152 converter; 154 inverter; 160 speed reducer; 170 drive shaft; 180 drive wheel; 200 motive power split mechanism; 202 sun gear; 204 pinion gear; 206 carrier; 208 ring gear; 210 input shaft; 220 output shaft; 502 shift lever; 504 shift position sensor; 506 accelerator pedal position sensor; 507 accelerator pedal; 508 kick-down switch; 510 engine revolution speed sensor; 512 vehicle speed sensor; 600 control device; 610 based driving force calculating unit; 620 restriction rate calculating unit; 630 request driving force calculating unit; 640 request power calculating unit; 650 lower limit revolution speed calculating unit; 660 engine control unit; 670 MG control unit.

The invention claimed is:

1. A vehicle capable of traveling responsive to a selected shift ratio selected by a driver from a plurality of shift ratios, comprising:
    a driving device generating driving force for said vehicle to travel;
    a switch turned off when an amount of operation of an accelerator by the driver is less than a predetermined amount, and turned on when said amount of operation of the accelerator is greater than said predetermined amount; and
    a control device controlling said driving device to increase said driving force when said switch changes from off to on, by placing a restriction on said driving force when said switch is off and removing said restriction on said driving force when said switch is on,
    said control device changing, responsive to said selected shift ratio, an increment in said driving force when said switch changes from off to on.

2. The vehicle according to claim 1, wherein
    the higher speed shift ratio said selected shift ratio is, to the greater value said control device sets said increment in said driving force when said switch changes from off to on.

3. The vehicle according to claim 2, wherein
    the higher speed shift ratio said selected shift ratio is, to the greater value said control device sets an amount of said restriction on said driving force when said switch is off so that the higher speed shift ratio said selected shift ratio is, the greater value said increment in said driving force when said switch changes from off to on is.

4. The vehicle according to claim 1, wherein
    said control device places no restriction on said driving force even when said switch is off when said selected shift ratio is a lowest speed shift ratio.

5. The vehicle according to claim 1, wherein
    said driving device includes at least a rotating electric machine using electric power to generate said driving force, and
    said vehicle is an electric vehicle or a hybrid vehicle capable of traveling by said driving force generated by said rotating electric machine.

6. A control method performed by a control device of a vehicle capable of traveling responsive to a selected shift ratio selected by a driver from a plurality of shift ratios, said vehicle including: a driving device generating driving force for said vehicle to travel; and a switch turned off when an amount of operation of an accelerator by the driver is less than a predetermined amount, and turned on when said amount of operation of the accelerator is greater than said predetermined amount,
    said control method comprising the steps of:
    determining said selected shift ratio; and
    controlling said driving device to increase said driving force when said switch changes from off to on, by placing a restriction on said driving force when said switch is off and removing said restriction on said driving force when said switch is on,
    said step of controlling said driving device including the step of changing, responsive to said selected shift ratio, an increment in said driving force when said switch changes from off to on.

\* \* \* \* \*